UNITED STATES PATENT OFFICE.

FREDERICK M. EKERT, OF DAYTON, OHIO.

PROCESS OF PREPARING BODIES CONTAINING RUBBER AND FIBER.

No. 836,068.     Specification of Letters Patent.     Patented Nov. 13, 1906.

Application filed May 28, 1906. Serial No. 319,095.

*To all whom it may concern:*

Be it known that I, FREDERICK M. EKERT, residing at Dayton, in the county of Montgomery and State of Ohio, have invented a certain new and useful Improvement in Processes of Preparing Bodies Containing Rubber and Fiber, of which the following is a full, clear, and exact description, reference being had to the accompanying drawings.

My invention relates to a method of producing compositions of matter wherein rubber or similar gum-like material and fibrous material are employed as ingredients thereof, and has for its object to so intermingle these ingredients as to produce a body wherein the binding effects of the fiber will be retained by preserving the fiber substantially intact. Such a body with the employment of suitable fibrous material, will withstand saturated or superheated steam, even under higher temperatures and pressures than now exist in modern industrial arts, as well as resist acids and alkalies and the passage of electric currents under high tension.

Asbestos has been recognized as a desirable ingredient to mingle with rubber in the production of bodies for various purposes; but the methods of mingling these ingredients heretofore practiced have been ineffective to produce bodies having the higher-resisting qualities referred to. I have found that in order to render the body much denser, stronger, and higher resisting it is absolutely necessary to preserve the fibrous condition of the asbestos or similar high-resisting fibrous ingredient. This I accomplish by thoroughly intermingling the rubber or gum-like material and the fibrous material in a dry condition, which can be done to excellent advantage by my hereinafter-described new dry process. To assist in this mixing, I may add to the rubber and fibrous material resin or other material which will produce like effects, the purpose of which is to make the rubber more plastic and more easily worked, allow larger compounding of the ingredients, and insure a thorough mixture of the ingredients and an intimate combination of the molecules thereof. I form a base of rubber and high-resisting fibrous material, such as asbestos mingled in a dry condition, and to this base may be added various other ingredients, according to the use to which the manufactured goods are to be applied. For many purposes pore-filling material, such as described in my Patent No. 802,377, issued October 24, 1905, will be preferred, and the rubber and fiber will generally be vulcanized, requiring the addition of a vulcanizing agent, such as sulfur, in suitable proportion to produce any desired vulcanization. Still other ingredients may be added, according to the price, quality, or use to which the body may be applied.

Prior to my invention the universal method of producing fiber-containing compounds with fibrous structure has been by the "wet process." In carrying out this process the fiber—as, for instance, asbestos fiber—is mixed in suitable vessels with rubber in solution. The pasty mass thus formed is placed in molds or between plates or rolls in order to press or squeeze out the liquid and form a body. The consequent steps of drying and manipulating make the process complicated and very costly, while the goods produced are of inferior quality on account of the uneven distribution of the fiber therein and the practically limited amount of rubber, rubber in a certain quantity being essential to insure the proper elasticity and coherence of the goods. Furthermore, fiber compounds produced by the wet process are not dense, but porous, absorb liquids freely, and consequently are not of high resisting quality.

The only other manner by which fiber and rubber have heretofore been mixed was by means of mixing-machines embodying differential rolls, wherein certain ingredients were mechanically incorporated with the dry rubber between steel rolls, such as are ordinarily employed by rubber factories. The construction of these machines, however, is such as to pull the fiber to pieces, finally reducing it to dust, while the friction developed by the grinding action of the rolls destroys the fibrous condition of the asbestos before it is incorporated into the rubber. Moreover, the heat prevents the addition of any considerable quantity of asbestos or any other materials, causing the combustion of the whole compound, which soon crumbles to a worthless mass.

As the first step of my process I prefer to break down the rubber or gum-like material mechanically on a mixing-machine to a dry, coherent, elastic, and somewhat viscous mass in order to bring the same to the condition in which it will best commingle with the asbestos. Then adding the fiber I squeeze this material into the rubber quickly and softly, practically without any friction, in a machine having rolls driven at an equal speed, which do not disintegrate the fiber, and, furthermore, as another very important feature of my process I keep the parts and the mixture entirely cool while being mixed.

Sulfur will generally be employed in the compounds produced by my process. This is added to the rubber, preferably after the same is broken down and before the addition of any other ingredient. After the sulfur has been well mixed with the rubber the resin (such as rosin and gums, as gum-mastic) is added, preferably in powdered form, in about the proportions set forth in my Patent No. 802,377 and mixed with the rubber and sulfur batch. To this mass of rubber, sulfur, and rosin is added the fibrous material, as asbestos, which is pressed into the said mass by passing the mass and the fiber through the even-motion rolls. By adding the ingredients in the order set forth and squeezing the fiber into the mass I am able to incorporate large quantities of fibrous material into the rubber without burning the rubber, without disintegrating the fibrous material and without causing deterioration of the compound. While good results may be obtained by adding the resin with the asbestos or other fiber, it is preferable to add the resin first, as it better facilitates the mixing of the fiber and the rubber. After the incorporation of the sulfur and fiber, or fiber alone into the rubber any other ingredients, pore-fillers, &c., may be added in suitable quantities, as pointed out in my Patent No. 802,377, issued October 24, 1905. By my manner of preparing the rubber for the reception of the sulfur, fiber, and other ingredients the physical properties of the rubber are practically unaffected, and it retains its quality of coherence, enabling it to form a strong, coherent, high resisting mass with the fibrous material and to permit the latter to be incorporated therewith in extremely large quantities. This manner of treating the rubber is totally different from the wet process, to which reference has been made heretofore, the objectionable features of which have been pointed out.

To make any fiber compound capable of being worked still more easily when being mixed with rubber by my dry process, I may use in place of or besides resins limited quantities of another emollient—such as oily or fatty matters, wax, paraffin, tar, pitch, asphalt, or similar materials—according to the purpose for which the product is to be employed. These materials may also be selected so as to contribute to the production of certain desired qualities in the manufactured goods. For example, oils, wax, or paraffin-like materials will make the goods water-repellent, as well as increase the insulating qualities of the goods, as do pitch and tar-like materials in a similar degree. Glycerin, for example, as an ingredient assists in repelling oil, which adapts it better for use in high-resisting packing for piston-rods wherein oil is employed as a lubricant. As the use of any of these ingredients and of resins in large proportions decreases the tensile strength and elasticity of the goods and makes it difficult as a manufacturing proposition to mix them with the other ingredients, they should be used in small or very moderate proportions.

Important features of my invention consist in the squeezing of the fiber evenly into the rubber or similar gum-like material practically without friction and taking the steps of the process in the order named, as these preserve the fiber in a fibrous condition without the necessity for any further complicated manipulation.

Having thus described my invention, I claim—

1. The process of producing compounds of rubber or similar gum-like material and fiber which consists in mingling the rubber and the fiber in a dry condition while preserving the fibrous condition of the fiber and the coherence of the rubber, substantially as specified.

2. The process of producing compounds of rubber or similar gum-like material and fiber, which consists in reducing the rubber to a dry, coherent, elastic and somewhat viscous mass and then pressing the fiber into this mass, substantially as specified.

3. The process of producing compounds of rubber or similar gum-like material and fiber which consists in softening the rubber without destroying the coherence thereof, mingling therewith sulfur for vulcanization, and mingling with the softened rubber and sulfur fibrous asbestos or similar fibrous material while preserving the fibrous condition of the fiber, substantially as specified.

4. The process of producing compounds of rubber or similar gum-like materials and fiber which consists in mingling the ingredients in a dry condition and keeping the mass cool at the same time so mingling the ingredients, while preserving the fibrous condition of the fiber and the coherence of the rubber, substantially as specified.

5. The process of producing vulcanizable compounds of rubber or similar gum-like materials and fiber, which consists in first mixing rubber and sulfur in a dry condition, then mixing with the mass thus formed fiber in a dry condition, while preserving the fibrous condition of the fiber, substantially as specified.

6. The process of producing vulcanizable compounds of rubber or similar gum-like materials and asbestos which consists in first mixing rubber and sulfur in a dry condition, then mixing the mass thus formed with asbestos also in a dry condition, substantially as specified.

7. The process of producing vulcanizable compounds of rubber, or similar gum-like material and fiber, which consists in mingling in a dry condition, rubber, sulfur and fiber, maintaining the mass cool during the mingling of the ingredients, and preserving the fibrous condition of the fiber, substantially as specified.

8. The process of producing vulcanizable compounds of rubber or similar gum-like materials and fiber which consists in mingling in a dry condition, rubber, sulfur and fiber, in its fibrous condition, in the presence of an emollient, substantially as specified.

9. The process of producing compounds of rubber or similar gum-like material and fiber, which consists in mingling such ingredients in a dry condition, in the presence of an emollient, while preserving the fibrous condition of the fiber, and keeping the mass cool during such mingling, substantially as specified.

10. The process of producing vulcanizable compounds of rubber or similar material and fiber which consists in adding to the rubber, sulfur, resin and fiber in the order named in a dry condition, and mixing after each addition, substantially as specified.

11. The process of producing compounds of rubber or similar gum-like material with fiber which consists in mingling in a dry condition rubber, sulfur, fiber, in its fibrous condition, and pore-filling materials in the presence of an emollient, substantially as specified.

12. The process of producing compounds of rubber, or similar gum-like material with high resisting fiber, which consists in causing the same to commingle in a dry condition by an even pressure on opposite sides thereof, substantially as specified.

13. The process of producing compounds of rubber or similar gum-like material with fiber which consists in reducing the rubber to a dry, coherent, elastic and somewhat viscous mass, adding thereto the fiber, and passing the fiber and rubber through even-motion rolls, substantially as specified.

14. The process of producing vulcanizable compounds of rubber or similar gum-like material with fiber which consists in adding to the rubber, sulfur and resin or similar emollient, in the order named and mixing after each addition, then adding fiber to the mass thus formed and passing the mass and fiber through even-motion rolls, substantially as specified.

15. The process of producing compounds of rubber, or similar gum-like material, with rubber, which consists in softening the rubber fiber, without destroying its coherent qualities, adding the fiber thereto, and causing the rubber and fiber to commingle by substantially even pressures in opposite directions, substantially as specified.

In testimony whereof I hereunto affix my signature in the presence of two witnesses.

FREDERICK M. EKERT.

Witnesses:
   JESSIE L. FAIRCHILD,
   ROSCOE T. STANTER.